Figure 1:
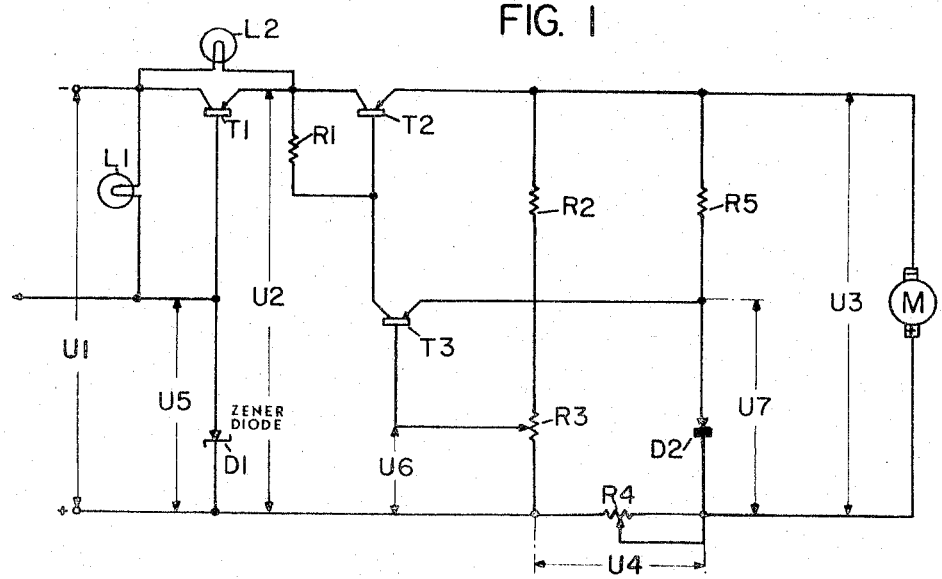

March 14, 1967   R. LIMLEY   3,309,596
CIRCUIT ARRANGEMENT FOR REGULATING THE SPEED OF MINIATURE
ELECTRIC D.C.-MOTORS
Filed Nov. 17, 1965

Robert Limley
*INVENTOR.*

BY
*Wenderoth, Lind & Ponack*

ATTORNEYS

United States Patent Office 3,309,596
Patented Mar. 14, 1967

3,309,596
CIRCUIT ARRANGEMENT FOR REGULATING THE SPEED OF MINIATURE ELECTRIC D.-C.- MOTORS
Robert Limley, Kirchdamm 5, Hemmingen-Westerfeld, Germany
Filed Nov. 17, 1965, Ser. No. 508,341
Claims priority, application Germany, Oct. 25, 1961, P 28,090
8 Claims. (Cl. 318—331)

This application is a continuation-in-part of my application Ser. No. 233,020, filed Oct. 25, 1962, now abandoned, entitled Circuit Arrangement for Regulating the Speed of miniature Electric D.C.-Motors.

The present invention relates to an arrangement for an automatic armature current-dependent controlling mechanism of an armature voltage of a constantly energized direct current shunt-wound motor which is being fed from a changeable direct current supply by means of a regulable semiconductor positioned in the armature circuit.

Direct current miniature motors for accessories drive are frequently used in the magnetic sound recording- and photographic technique. The main requirement for such motive means is their constant rate of revolutions. But, when using direct current motors certain difficulties arise in obtaining the necessary exactness in the number of revolutions during a change in voltage of the operating voltages as well as during load changes. If for instance, the rate of revolutions is not constant in sound recording and sound reproduction devices, a change in pitch takes place as for instance during changes in the number of revolutions as frequency modulation occurs.

In order to keep the rate of revolutions of direct current motors constant, many solutions have been suggested. Such a one, for instance, exists in the use of centrifugal governors. These are mostly arranged in the main circuit and influence, at least partially, the armature current. According to another solution the stabilization of the electrical number of revolutions is obtained in a direct current shunt-wound motor by regulating the field current. A further known method which also necessitates an electro-magnetically generated field is the use of compound windings. These mainly depend on a series winding which is located beside the field winding put in shunt. Thereby the number of revolutions can be kept constant within a certain range at a variable torsional moment. A further method is known in stabilizing the number of revolutions of a direct current motor, the magnetic field of which is energized by permanent magnets, by feeding through a constant voltage source, for instance dry cell batteries, lead storage cells or nickel batteries, also by stabilized voltage supply devices. Finally, a circuit has been suggested for the stabilization of the rate of revolutions of electrical shunt-wound motors, in which the brush voltage is changeable depending on the load. See French Patent No. 1,227,670 and British Patent No. 900,088, July 4, 1962 which corresponds therewith.

In the above-mentioned methods certain deficiencies and disadvantages are inherent. Centrifugal governors do not operate inertialess, they change because of the regulating process, the angular velocity of the rotor finally generate during the opening or closing of the contact or contacts electrical interference fields and magnetic interference fields originating from the armature. During the operation of magnetic sound recording devices the inconstancy of the angular velocity can cause variations in the pitch; the interference fields in turn worsen the interference distance of the magnetic sound recording device. A further disadvantage of centrifugal governors exists in their instability which in turn is caused by inconstant contact resistances, wear and tear, flow of materials, etc. Also, during the use of centrifugal governors mechanical noises arise which are caused by the opening and closing of the governor contacts. Because of the changes of the armature current resulting therefrom in connection with magnetic imbalances which cannot be eliminated, further noises result.

A stabilization of the number of revolutions in direct current shunt-wound motors by directing the field current is eliminated when direct current motors with permanent magnets are used for producing the magnetic field. The same is applicable as well for the compound wound motor. Direct current motors, the field of which is generated by permanent magnets operate only so long with a constant number of revolutions as operating voltage and load condition remain constant. Often in industrial instances variable torsional moments are required as for instance for the winding up of a record support, when scanning records, and when the runnings are out of round due to the respective transmission mechanics.

According to the present invention the number of revolutions is maintained constant also during automatic change of the input voltage, while in known devices for the regulation of electrical shunt-wound motors the number of revolutions changes with the volume of the voltage. (French Patent No. 1,227,670, British Patent No. 900,- 088.)

It is an object of the present invention to eliminate these deficiencies and disadvantages. This invention therefore consists essentially in that the semi-conductor is regulated in relationship with a direct current control potential regulating mechanism which consists of a sum of a constant direct current voltage potential and of an armature proportional direct current voltage potential minus a direct current voltage potential being armature voltage dependent.

A further object of this invention consists in that the direct current voltage potential regulating mechanism is formed in a bridge circuit arranged parallel to the armature winding which consists in one branch of ohmic resistances, in another branch of a series connection of a semiconductor diode and of an ohmic resistance and of an ohmic resistance being arranged between the two branches.

According to further characteristics of the invention on one hand as a constant direct current voltage potential a passage voltage of the semiconductor diode is used and on the other hand between the changeable direct current source and the semiconductor an additional voltage stabilization device is arranged. Thereby the voltage stabilization device consists of a regulated semiconductor being located in the main circuit, the base of which is connected via a Zener diode with a changeable voltage source and via a non-linear resistance with its collector.

In a further advantageous embodiment of the present invention the collector emitter distances of the controlled semiconductor are bridged by non-linear resistances. Finally, this invention is completed in that the direct current voltage which is armature voltage regulated can be changed continuously by an adjustable ohmic resistance.

The invention is illustrated in tht drawings by two embodiments.

Figure 2:
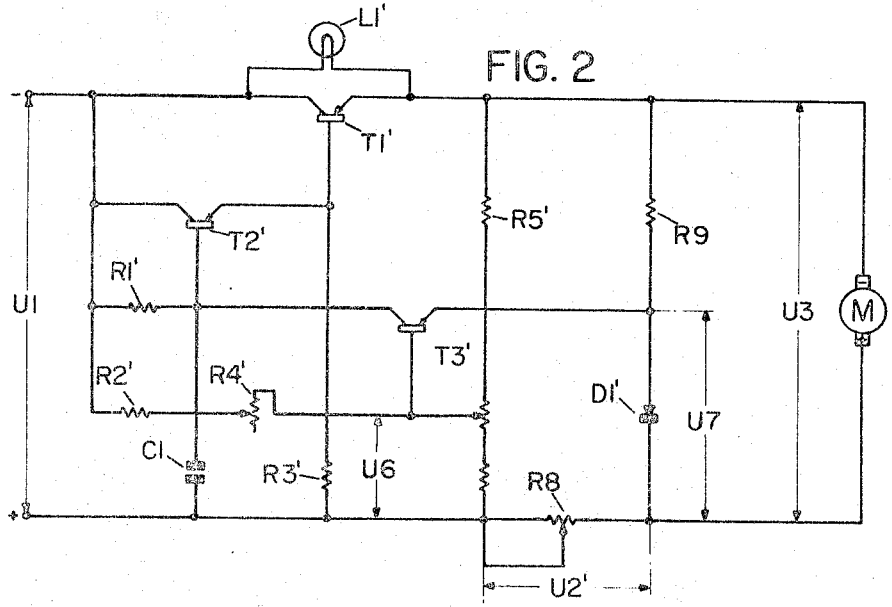

FIG. 1 is an arrangement for an automatic armature voltage regulated control mechanism of an armature voltage of a constantly energized direct current shunt-wound motor in which the variable input voltage is transformed into two steps into the operating voltage of the motor, and FIG. 2 shows a similar arrangement in which the variable input voltage is transformed in one step into the operating voltage of the motor.

According to FIG. 1 the variable voltage U1, equal to about the discharge potential of a direct current battery or of an accumulator, is transformed by the regulated semiconductor T1 and the Zener diode D1 to a stabilized voltage U2. The lamp L1, a non-linear resistance, is used for the stabilization of the Zener current.

From the Zener diode D1 simultaneously a constant voltage U5 for smaller currents, as for instance for the operation of a transistor amplifier, can be taken. The lamp L2 is used for relieving the circuit of the semiconductor T1 at an increased voltage U1. Thereby it is possible to use a relatively small transistor without the maximum permissible powerloss being exceeded. With the other modulable semiconductor T2 a constant direct current voltage U3 is obtained adjustable by the resistance R3 but being dependable from the armature current of the motor which at the same time corresponds to the brush voltage of the motor M. The base of the semiconductor T2 is controlled by the collector current of the comparison transistor T3, by comparing the (constant) passage voltage U7 of diode D2, positioned at the emitter, with a taped voltage U6, positioned at the base, which is located at the collector ring of a potentiometer R3. With the resistance R5 the passage current of the diode D2 is defined.

For limiting the range of adjustment of the operating voltage of the motor U3 pre-resistance R2 is provided which is located in front of the potentiometer R3. The adjustment resistance R4 is used for transforming the armature current proportional voltage U4. By the adjustable regulator R3 the desired rate of revolutions of the motor M can be adjusted to operating condition.

In FIG. 2 a different embodiment is illustrated which operates according to the same principle. The input voltage U1, however, is not pre-stabilized to the voltage U2, but directly via the series transmitter T2' to the operating voltage U3 of the motor. The potentiometer branch of the adjustable bridge contains additionally the resistance R6 in order to limit the adjustable range for the operating voltage of the motor also towards the bottom. In order to adjust the cross current of the control device as small as possible between transistor T2' and transistor T3' a transistor may be arranged as an impedance transformer. As operating resistance for the transistor T3' resistance R7 is provided. A resistance R3' is used for leaking off residual current from transistor T2', the condenser C1 for counteracting disturbing high frequency oscillations, the resistances R8 and R9 for compensating the dependence of the voltage U3 from the variable input voltage U1 and finally a lamp L1' serves for the relief of transistor T2'.

I claim:

1. Arrangement for maintaining constant the number of revolutions of a constantly energized direct current shunt motor despite occurring changes of the direct current supply voltage and of the load comprising a first transistor, the collector-emitter distance of which is connected in series within the armature circuit of said motor, a second transistor, the collector electrode of which is coupled to the base electrode of said first transistor, circuit means for deriving a direct current voltage and for feeding said control voltage to the base and emitter electrodes of said second transistor, said control voltage being the sum of a constant direct current voltage and a voltage proportional to the armature direct current minus a voltage which is proportional to the armature direct current voltage.

2. Arrangement according to claim 1 wherein said circuit means for deriving a direct current control voltage comprise a first and a second branch connected across the armature winding of the direct current shunt motor and an ohmic resistance arranged between said two branches in the motor feed line, said first branch being built up from ohmic resistances and said second branch being built up from a series connection of a semiconductor diode and an ohmic resistance.

3. Arrangement according to claim 2 wherein one of the ohmic resistances in said first branch is a potentiometer, the slider of which is coupled to the base electrode of said second transistor while a tap between the semiconductor diode and the ohmic resistance in said second branch is coupled to the emitter electrode of said second transistor.

4. Arrangement according to claim 1 wherein said constant direct current voltage is the passage voltage of a semiconductor diode.

5. Arrangement according to claim 1 wherein between said direct current supply voltage and said first transistor a voltage stabilization device is arranged.

6. Arrangement according to claim 5 wherein said voltage stabilization device comprises a third controllable transistor whose base is connected via a Zener diode with said direct current supply voltage and via a non-linear resistance with its collector.

7. Arrangement according to claim 6 wherein the collector emitter distances of said controllable transistor are bridged over by non-linear resistance.

8. Arrangement according to claim 1 wherein said direct current voltage dependent on the armature direct current voltage is continuously changeable via an ohmic adjustable resistance.

References Cited by the Examiner

UNITED STATES PATENTS

| | | | |
|---|---|---|---|
| 2,975,349 | 3/1961 | Green | 318—331 |
| 3,165,688 | 1/1965 | Gutzwiller | 318—331 X |
| 3,177,417 | 4/1965 | Wright | 318—331 |
| 3,250,979 | 5/1966 | Shaw | 318—395 |

FOREIGN PATENTS 900,088    7/1962    Great Britain.

ORIS L. RADER, *Primary Examiner.*

J. C. BERENZWEIG, *Assistant Examiner,*